US012433815B2

(12) United States Patent
Ashby

(10) Patent No.: US 12,433,815 B2
(45) Date of Patent: Oct. 7, 2025

(54) MASSAGE ROLLER WITH PRESSURE SENSORS

(71) Applicant: iFIT Inc., Logan, UT (US)

(72) Inventor: Darren C. Ashby, Richmond, UT (US)

(73) Assignee: iFIT Inc., Logan, UT (US)

( * ) Notice: Subject to any disclaimer, the term of this patent is extended or adjusted under 35 U.S.C. 154(b) by 1001 days.

(21) Appl. No.: 17/492,104

(22) Filed: Oct. 1, 2021

(65) Prior Publication Data

US 2022/0104992 A1 Apr. 7, 2022

Related U.S. Application Data

(60) Provisional application No. 63/086,793, filed on Oct. 2, 2020.

(51) Int. Cl.
*A61H 15/00* (2006.01)

(52) U.S. Cl.
CPC ..... *A61H 15/00* (2013.01); *A61H 2015/0014* (2013.01); *A61H 2201/5007* (2013.01); *A61H 2201/5071* (2013.01); *A61H 2230/605* (2013.01)

(58) Field of Classification Search
CPC .... A61H 2015/0014; A61H 2201/5007; A61H 2201/5048; A61H 2201/5071; A61H 2230/60; A61H 2230/605; A61H 15/00; A61H 2201/1695
USPC ............. 601/118, 120, 102, 115, 119, 19, 99
See application file for complete search history.

(56) References Cited

U.S. PATENT DOCUMENTS

| | | | |
|---|---|---|---|
| 3,123,646 | A | 3/1964 | Easton |
| 3,579,339 | A | 5/1971 | Chang et al. |
| 4,023,795 | A | 5/1977 | Pauls |
| 4,300,760 | A | 11/1981 | Bobroff |
| D286,311 | S | 10/1986 | Martinell et al. |
| 4,681,318 | A | 7/1987 | Lay |
| 4,684,126 | A | 8/1987 | Dalebout et al. |
| 4,728,102 | A | 3/1988 | Pauls |
| 4,750,736 | A | 6/1988 | Watterson |
| 4,796,881 | A | 1/1989 | Watterson |
| 4,813,667 | A | 3/1989 | Watterson |
| 4,830,371 | A | 5/1989 | Lay |
| 4,844,451 | A | 7/1989 | Bersonnet et al. |
| 4,850,585 | A | 7/1989 | Dalebout et al. |
| D304,849 | S | 11/1989 | Watterson |
| 4,880,225 | A | 11/1989 | Lucas et al. |
| 4,883,272 | A | 11/1989 | Lay |
| D306,468 | S | 3/1990 | Watterson |

(Continued)

FOREIGN PATENT DOCUMENTS

| | | | | |
|---|---|---|---|---|
| CN | 111419666 A * | 7/2020 | ......... | A61H 15/0078 |
| DE | 202017102541 U1 * | 7/2017 | ............. | A61H 15/00 |

OTHER PUBLICATIONS

U.S. Appl. No. 17/066,485, filed Oct. 9, 2020, Weston et al.

(Continued)

*Primary Examiner* — Victoria Murphy
*Assistant Examiner* — Tina Zhang
(74) *Attorney, Agent, or Firm* — Holland & Hart LLP

(57) ABSTRACT

A massage roller includes a body having a first end, a second end, and a rolling surface extending between the first end and the second end. A pressure sensor is located at the rolling surface. Pressure measurements taken by the pressure sensor form a pressure profile. Knots, tightness, and other muscle pain are determined by analyzing the pressure profile.

13 Claims, 3 Drawing Sheets

(56) References Cited

U.S. PATENT DOCUMENTS

| | | | |
|---|---|---|---|
| D306,891 | S | 3/1990 | Watterson |
| 4,913,396 | A | 4/1990 | Dalebout et al. |
| D307,614 | S | 5/1990 | Bingham et al. |
| D307,615 | S | 5/1990 | Bingham et al. |
| 4,921,242 | A | 5/1990 | Watterson |
| 4,932,650 | A | 6/1990 | Bingham et al. |
| D309,167 | S | 7/1990 | Griffin |
| D309,485 | S | 7/1990 | Bingham et al. |
| 4,938,478 | A | 7/1990 | Lay |
| D310,253 | S | 8/1990 | Bersonnet et al. |
| 4,955,599 | A | 9/1990 | Bersonnet et al. |
| 4,971,316 | A | 11/1990 | Dalebout et al. |
| D313,055 | S | 12/1990 | Watterson |
| 4,974,832 | A | 12/1990 | Dalebout |
| 4,979,737 | A | 12/1990 | Kock |
| 4,981,294 | A | 1/1991 | Dalebout et al. |
| D315,765 | S | 3/1991 | Measom et al. |
| 4,998,725 | A | 3/1991 | Watterson et al. |
| 5,000,442 | A | 3/1991 | Dalebout et al. |
| 5,000,443 | A | 3/1991 | Dalebout et al. |
| 5,000,444 | A | 3/1991 | Dalebout et al. |
| D316,124 | S | 4/1991 | Dalebout et al. |
| 5,013,033 | A | 5/1991 | Watterson et al. |
| 5,014,980 | A | 5/1991 | Bersonnet et al. |
| 5,016,871 | A | 5/1991 | Dalebout et al. |
| D318,085 | S | 7/1991 | Jacobson et al. |
| D318,086 | S | 7/1991 | Bingham et al. |
| D318,699 | S | 7/1991 | Jacobson et al. |
| 5,029,801 | A | 7/1991 | Dalebout et al. |
| 5,034,576 | A | 7/1991 | Dalebout et al. |
| 5,058,881 | A | 10/1991 | Measom |
| 5,058,882 | A | 10/1991 | Dalebout et al. |
| D321,388 | S | 11/1991 | Dalebout |
| 5,062,626 | A | 11/1991 | Dalebout et al. |
| 5,062,627 | A | 11/1991 | Bingham |
| 5,062,632 | A | 11/1991 | Dalebout et al. |
| 5,062,633 | A | 11/1991 | Engel et al. |
| 5,067,710 | A | 11/1991 | Watterson et al. |
| 5,072,929 | A | 12/1991 | Peterson et al. |
| D323,009 | S | 1/1992 | Dalebout et al. |
| D323,198 | S | 1/1992 | Dalebout et al. |
| D323,199 | S | 1/1992 | Dalebout et al. |
| D323,863 | S | 2/1992 | Watterson |
| 5,088,729 | A | 2/1992 | Dalebout |
| 5,090,694 | A | 2/1992 | Pauls et al. |
| 5,102,380 | A | 4/1992 | Jacobson et al. |
| 5,104,120 | A | 4/1992 | Watterson et al. |
| 5,108,093 | A | 4/1992 | Watterson |
| D326,491 | S | 5/1992 | Dalebout |
| 5,122,105 | A | 6/1992 | Engel et al. |
| 5,135,216 | A | 8/1992 | Bingham et al. |
| 5,147,265 | A | 9/1992 | Pauls et al. |
| 5,149,084 | A | 9/1992 | Dalebout et al. |
| 5,149,312 | A | 9/1992 | Croft et al. |
| 5,171,196 | A | 12/1992 | Lynch |
| D332,347 | S | 1/1993 | Raadt et al. |
| 5,190,505 | A | 3/1993 | Dalebout et al. |
| 5,192,255 | A | 3/1993 | Dalebout et al. |
| 5,195,937 | A | 3/1993 | Engel et al. |
| 5,203,826 | A | 4/1993 | Dalebout |
| D335,511 | S | 5/1993 | Engel et al. |
| D335,905 | S | 5/1993 | Cutter et al. |
| D336,498 | S | 6/1993 | Engel et al. |
| 5,217,487 | A | 6/1993 | Engel et al. |
| D337,361 | S | 7/1993 | Engel et al. |
| D337,666 | S | 7/1993 | Peterson et al. |
| D337,799 | S | 7/1993 | Cutter et al. |
| 5,226,866 | A | 7/1993 | Engel et al. |
| 5,244,446 | A | 9/1993 | Engel et al. |
| 5,247,853 | A | 9/1993 | Dalebout |
| 5,259,611 | A | 11/1993 | Dalebout et al. |
| D342,106 | S | 12/1993 | Campbell et al. |
| 5,279,528 | A | 1/1994 | Dalebout et al. |
| D344,112 | S | 2/1994 | Smith |
| D344,557 | S | 2/1994 | Ashby |
| 5,282,776 | A | 2/1994 | Dalebout |
| 5,295,931 | A | 3/1994 | Dreibelbis et al. |
| 5,302,161 | A | 4/1994 | Loubert et al. |
| D347,251 | S | 5/1994 | Dreibelbis et al. |
| 5,316,534 | A | 5/1994 | Dalebout et al. |
| D348,493 | S | 7/1994 | Ashby |
| D348,494 | S | 7/1994 | Ashby |
| 5,328,164 | A | 7/1994 | Soga |
| D349,931 | S | 8/1994 | Bostic et al. |
| 5,336,142 | A | 8/1994 | Dalebout et al. |
| 5,344,376 | A | 9/1994 | Bostic et al. |
| D351,202 | S | 10/1994 | Bingham |
| D351,435 | S | 10/1994 | Peterson et al. |
| D351,633 | S | 10/1994 | Bingham |
| D352,534 | S | 11/1994 | Dreibelbis et al. |
| D353,422 | S | 12/1994 | Bostic et al. |
| 5,372,559 | A | 12/1994 | Dalebout et al. |
| 5,374,228 | A | 12/1994 | Buisman et al. |
| 5,382,221 | A | 1/1995 | Hsu et al. |
| 5,387,168 | A | 2/1995 | Bostic |
| 5,393,690 | A | 2/1995 | Fu et al. |
| D356,128 | S | 3/1995 | Smith et al. |
| 5,409,435 | A | 4/1995 | Daniels |
| 5,429,563 | A | 7/1995 | Engel et al. |
| 5,431,612 | A | 7/1995 | Holden |
| D360,915 | S | 8/1995 | Bostic et al. |
| 5,468,205 | A | 11/1995 | McFall et al. |
| 5,489,249 | A | 2/1996 | Brewer et al. |
| 5,492,517 | A | 2/1996 | Bostic et al. |
| D367,689 | S | 3/1996 | Wilkinson et al. |
| 5,511,740 | A | 4/1996 | Loubert et al. |
| 5,512,025 | A | 4/1996 | Dalebout et al. |
| D370,949 | S | 6/1996 | Furner |
| D371,176 | S | 6/1996 | Furner |
| 5,527,245 | A | 6/1996 | Dalebout et al. |
| 5,529,553 | A | 6/1996 | Finlayson |
| 5,540,429 | A | 7/1996 | Dalebout et al. |
| 5,549,533 | A | 8/1996 | Olson et al. |
| 5,554,085 | A | 9/1996 | Dalebout |
| 5,569,128 | A | 10/1996 | Dalebout |
| 5,591,105 | A | 1/1997 | Dalebout et al. |
| 5,591,106 | A | 1/1997 | Dalebout et al. |
| 5,595,556 | A | 1/1997 | Dalebout et al. |
| 5,607,375 | A | 3/1997 | Dalebout et al. |
| 5,611,539 | A | 3/1997 | Watterson et al. |
| 5,622,527 | A | 4/1997 | Watterson et al. |
| 5,626,538 | A | 5/1997 | Dalebout et al. |
| 5,626,542 | A | 5/1997 | Dalebout et al. |
| D380,024 | S | 6/1997 | Novak et al. |
| 5,637,059 | A | 6/1997 | Dalebout |
| D380,509 | S | 7/1997 | Wilkinson et al. |
| 5,643,153 | A | 7/1997 | Nylen et al. |
| 5,645,509 | A | 7/1997 | Brewer et al. |
| D384,118 | S | 9/1997 | Deblauw |
| 5,662,557 | A | 9/1997 | Watterson et al. |
| 5,669,857 | A | 9/1997 | Watterson et al. |
| 5,672,140 | A | 9/1997 | Watterson et al. |
| 5,674,156 | A | 10/1997 | Watterson et al. |
| 5,674,453 | A | 10/1997 | Watterson et al. |
| 5,676,624 | A | 10/1997 | Watterson et al. |
| 5,683,331 | A | 11/1997 | Dalebout |
| 5,683,332 | A | 11/1997 | Watterson et al. |
| D387,825 | S | 12/1997 | Fleck et al. |
| 5,695,433 | A | 12/1997 | Buisman |
| 5,695,434 | A | 12/1997 | Dalebout et al. |
| 5,695,435 | A | 12/1997 | Dalebout et al. |
| 5,702,325 | A | 12/1997 | Watterson et al. |
| 5,704,879 | A | 1/1998 | Watterson et al. |
| 5,718,657 | A | 2/1998 | Dalebout et al. |
| 5,720,200 | A | 2/1998 | Anderson et al. |
| 5,720,698 | A | 2/1998 | Dalebout et al. |
| D392,006 | S | 3/1998 | Dalebout et al. |
| 5,722,922 | A | 3/1998 | Watterson et al. |
| 5,733,229 | A | 3/1998 | Dalebout et al. |
| 5,743,833 | A | 4/1998 | Watterson et al. |
| 5,762,584 | A | 6/1998 | Daniels |
| 5,762,587 | A | 6/1998 | Dalebout et al. |
| 5,772,560 | A | 6/1998 | Watterson et al. |

(56) References Cited

U.S. PATENT DOCUMENTS

| | | | | |
|---|---|---|---|---|
| 5,792,080 | A * | 8/1998 | Ookawa | A61H 15/0078 601/134 |
| 5,810,698 | A | 9/1998 | Hullett et al. | |
| 5,827,155 | A | 10/1998 | Jensen et al. | |
| 5,830,114 | A | 11/1998 | Halfen et al. | |
| 5,860,893 | A | 1/1999 | Watterson et al. | |
| 5,860,894 | A | 1/1999 | Dalebout et al. | |
| 5,899,834 | A | 5/1999 | Dalebout et al. | |
| D412,953 | S | 8/1999 | Armstrong | |
| D413,948 | S | 9/1999 | Dalebout | |
| 5,951,441 | A | 9/1999 | Dalebout et al. | |
| 5,951,448 | A | 9/1999 | Bolland | |
| D416,596 | S | 11/1999 | Armstrong | |
| 6,003,166 | A | 12/1999 | Hald et al. | |
| 6,019,710 | A | 2/2000 | Dalebout et al. | |
| 6,027,429 | A | 2/2000 | Daniels | |
| 6,033,347 | A | 3/2000 | Dalebout et al. | |
| D425,940 | S | 5/2000 | Halfen et al. | |
| 6,059,692 | A | 5/2000 | Hickman | |
| D428,949 | S | 8/2000 | Simonson | |
| 6,123,646 | A | 9/2000 | Colassi | |
| 6,171,217 | B1 | 1/2001 | Cutler | |
| 6,171,219 | B1 | 1/2001 | Simonson | |
| 6,174,267 | B1 | 1/2001 | Dalebout et al. | |
| 6,193,631 | B1 | 2/2001 | Hickman | |
| 6,228,003 | B1 | 5/2001 | Hald et al. | |
| 6,238,323 | B1 | 5/2001 | Simonson | |
| 6,251,052 | B1 | 6/2001 | Simonson | |
| 6,261,022 | B1 | 7/2001 | Dalebout et al. | |
| 6,280,362 | B1 | 8/2001 | Dalebout et al. | |
| 6,296,594 | B1 | 10/2001 | Simonson | |
| D450,872 | S | 11/2001 | Dalebout et al. | |
| 6,312,363 | B1 | 11/2001 | Watterson et al. | |
| D452,338 | S | 12/2001 | Dalebout et al. | |
| D453,543 | S | 2/2002 | Cutler | |
| D453,948 | S | 2/2002 | Cutler | |
| 6,350,218 | B1 | 2/2002 | Dalebout et al. | |
| 6,387,020 | B1 | 5/2002 | Simonson | |
| 6,413,191 | B1 | 7/2002 | Harris et al. | |
| 6,422,980 | B1 | 7/2002 | Simonson | |
| 6,447,424 | B1 | 9/2002 | Ashby et al. | |
| 6,458,060 | B1 | 10/2002 | Watterson et al. | |
| 6,458,061 | B2 | 10/2002 | Simonson | |
| 6,471,622 | B1 | 10/2002 | Hammer et al. | |
| 6,563,225 | B2 | 5/2003 | Soga et al. | |
| 6,601,016 | B1 | 7/2003 | Brown et al. | |
| 6,623,140 | B2 | 9/2003 | Watterson et al. | |
| 6,626,799 | B2 | 9/2003 | Watterson et al. | |
| 6,652,424 | B2 | 11/2003 | Dalebout | |
| 6,685,607 | B1 | 2/2004 | Olson | |
| 6,695,581 | B2 | 2/2004 | Wasson et al. | |
| 6,701,271 | B2 | 3/2004 | Willner et al. | |
| 6,702,719 | B1 | 3/2004 | Brown et al. | |
| 6,712,740 | B2 | 3/2004 | Simonson | |
| 6,730,002 | B2 | 5/2004 | Hald et al. | |
| 6,743,153 | B2 | 6/2004 | Watterson et al. | |
| 6,746,371 | B1 | 6/2004 | Brown et al. | |
| 6,749,537 | B1 | 6/2004 | Hickman | |
| 6,761,667 | B1 | 7/2004 | Cutler et al. | |
| 6,770,015 | B2 | 8/2004 | Simonson | |
| 6,786,852 | B2 | 9/2004 | Watterson et al. | |
| 6,808,472 | B1 | 10/2004 | Hickman | |
| 6,821,230 | B2 | 11/2004 | Dalebout et al. | |
| 6,830,540 | B2 | 12/2004 | Watterson et al. | |
| 6,863,641 | B1 | 3/2005 | Brown et al. | |
| 6,866,613 | B1 | 3/2005 | Brown et al. | |
| 6,875,160 | B2 | 4/2005 | Watterson et al. | |
| D507,311 | S | 7/2005 | Butler et al. | |
| 6,918,858 | B2 | 7/2005 | Watterson et al. | |
| 6,921,351 | B1 | 7/2005 | Hickman et al. | |
| 6,974,404 | B1 | 12/2005 | Watterson et al. | |
| 6,997,852 | B2 | 2/2006 | Watterson et al. | |
| 7,025,713 | B2 | 4/2006 | Dalebout et al. | |
| D520,085 | S | 5/2006 | Willardson et al. | |
| 7,044,897 | B2 | 5/2006 | Myers et al. | |
| 7,052,442 | B2 | 5/2006 | Watterson et al. | |
| 7,060,006 | B1 | 6/2006 | Watterson et al. | |
| 7,060,008 | B2 | 6/2006 | Watterson et al. | |
| 7,070,539 | B2 | 7/2006 | Brown et al. | |
| 7,097,588 | B2 | 8/2006 | Watterson et al. | |
| D527,776 | S | 9/2006 | Willardson et al. | |
| 7,112,168 | B2 | 9/2006 | Dalebout et al. | |
| 7,128,693 | B2 | 10/2006 | Brown et al. | |
| 7,166,062 | B1 | 1/2007 | Watterson et al. | |
| 7,166,064 | B2 | 1/2007 | Watterson et al. | |
| 7,169,087 | B2 | 1/2007 | Ercanbrack et al. | |
| 7,169,093 | B2 | 1/2007 | Simonson et al. | |
| 7,192,388 | B2 | 3/2007 | Dalebout et al. | |
| 7,250,022 | B2 | 7/2007 | Dalebout et al. | |
| 7,282,016 | B2 | 10/2007 | Simonson | |
| 7,285,075 | B2 | 10/2007 | Cutler et al. | |
| 7,344,481 | B2 | 3/2008 | Watterson et al. | |
| 7,377,882 | B2 | 5/2008 | Watterson et al. | |
| 7,425,188 | B2 | 9/2008 | Ercanbrack et al. | |
| 7,429,236 | B2 | 9/2008 | Dalebout et al. | |
| 7,455,622 | B2 | 11/2008 | Watterson et al. | |
| 7,482,050 | B2 | 1/2009 | Olson | |
| D588,655 | S | 3/2009 | Utykanski | |
| 7,510,509 | B2 | 3/2009 | Hickman | |
| 7,537,546 | B2 | 5/2009 | Watterson et al. | |
| 7,537,549 | B2 | 5/2009 | Nelson et al. | |
| 7,537,552 | B2 | 5/2009 | Dalebout et al. | |
| 7,540,828 | B2 | 6/2009 | Watterson et al. | |
| 7,549,947 | B2 | 6/2009 | Hickman et al. | |
| 7,556,590 | B2 | 7/2009 | Watterson et al. | |
| 7,563,203 | B2 | 7/2009 | Dalebout et al. | |
| 7,575,536 | B1 | 8/2009 | Hickman | |
| 7,601,105 | B1 | 10/2009 | Gipson et al. | |
| 7,604,573 | B2 | 10/2009 | Dalebout et al. | |
| D604,373 | S | 11/2009 | Dalebout et al. | |
| 7,618,350 | B2 | 11/2009 | Dalebout et al. | |
| 7,618,357 | B2 | 11/2009 | Dalebout et al. | |
| 7,625,315 | B2 | 12/2009 | Hickman | |
| 7,625,321 | B2 | 12/2009 | Simonson et al. | |
| 7,628,730 | B1 | 12/2009 | Watterson et al. | |
| 7,628,737 | B2 | 12/2009 | Kowallis et al. | |
| 7,637,847 | B1 | 12/2009 | Hickman | |
| 7,645,212 | B2 | 1/2010 | Ashby et al. | |
| 7,645,213 | B2 | 1/2010 | Watterson et al. | |
| 7,658,698 | B2 | 2/2010 | Pacheco et al. | |
| 7,674,205 | B2 | 3/2010 | Dalebout et al. | |
| 7,713,171 | B1 | 5/2010 | Hickman | |
| 7,713,172 | B2 | 5/2010 | Watterson et al. | |
| 7,713,180 | B2 | 5/2010 | Wickens et al. | |
| 7,717,828 | B2 | 5/2010 | Simonson et al. | |
| 7,736,279 | B2 | 6/2010 | Dalebout et al. | |
| 7,740,563 | B2 | 6/2010 | Dalebout et al. | |
| 7,749,144 | B2 | 7/2010 | Hammer | |
| 7,766,797 | B2 | 8/2010 | Dalebout et al. | |
| 7,771,329 | B2 | 8/2010 | Dalebout et al. | |
| 7,775,940 | B2 | 8/2010 | Dalebout et al. | |
| 7,789,800 | B1 | 9/2010 | Watterson et al. | |
| 7,798,946 | B2 | 9/2010 | Dalebout et al. | |
| 7,815,550 | B2 | 10/2010 | Watterson et al. | |
| 7,857,731 | B2 | 12/2010 | Hickman et al. | |
| 7,862,475 | B2 | 1/2011 | Watterson et al. | |
| 7,862,478 | B2 | 1/2011 | Watterson et al. | |
| 7,862,483 | B2 | 1/2011 | Hendrickson et al. | |
| D635,207 | S | 3/2011 | Dalebout et al. | |
| 7,901,330 | B2 | 3/2011 | Dalebout et al. | |
| 7,909,740 | B2 | 3/2011 | Dalebout et al. | |
| 7,980,996 | B2 | 7/2011 | Hickman | |
| 7,981,000 | B2 | 7/2011 | Watterson et al. | |
| 7,985,164 | B2 | 7/2011 | Ashby | |
| 8,029,415 | B2 | 10/2011 | Ashby et al. | |
| 8,033,960 | B1 | 10/2011 | Dalebout et al. | |
| D650,451 | S | 12/2011 | Olson et al. | |
| D652,877 | S | 1/2012 | Dalebout et al. | |
| 8,152,702 | B2 | 4/2012 | Pacheco | |
| D659,775 | S | 5/2012 | Olson et al. | |
| D659,777 | S | 5/2012 | Watterson et al. | |
| D660,383 | S | 5/2012 | Watterson et al. | |
| D664,613 | S | 7/2012 | Dalebout et al. | |
| 8,251,874 | B2 | 8/2012 | Ashby et al. | |

(56) References Cited

U.S. PATENT DOCUMENTS 8,298,123 B2 10/2012 Hickman
8,298,125 B2 10/2012 Colledge et al.
D671,177 S 11/2012 Sip
D671,178 S 11/2012 Sip
D673,626 S 1/2013 Olson et al.
8,690,735 B2 4/2014 Watterson et al.
D707,763 S 6/2014 Cutler
8,740,753 B2 6/2014 Olson et al.
8,758,201 B2 6/2014 Ashby et al.
8,771,153 B2 7/2014 Dalebout et al.
8,784,270 B2 7/2014 Ashby et al.
8,808,148 B2 8/2014 Watterson et al.
8,814,762 B2 8/2014 Butler et al.
D712,493 S 9/2014 Ercanbrack et al.
8,840,075 B2 9/2014 Dalebout et al.
8,845,493 B2 9/2014 Watterson et al.
8,870,726 B2 10/2014 Watterson et al.
8,876,668 B2 11/2014 Hendrickson et al.
8,894,549 B2 11/2014 Colledge
8,894,555 B2 11/2014 Colledge et al.
8,911,330 B2 12/2014 Watterson et al.
8,920,288 B2 12/2014 Dalebout et al.
8,986,165 B2 3/2015 Ashby
8,992,364 B2 3/2015 Law et al.
8,992,387 B2 3/2015 Watterson et al.
D726,476 S 4/2015 Ercanbrack
9,028,368 B2 5/2015 Ashby et al.
9,028,370 B2 5/2015 Watterson et al.
9,039,578 B2 5/2015 Dalebout
D731,011 S 6/2015 Buchanan
9,072,930 B2 7/2015 Ashby et al.
9,119,983 B2 9/2015 Rhea
9,123,317 B2 9/2015 Watterson et al.
9,126,071 B2 9/2015 Smith
9,126,072 B2 9/2015 Watterson
9,138,615 B2 9/2015 Olson et al.
9,142,139 B2 9/2015 Watterson et al.
9,144,703 B2 9/2015 Dalebout et al.
9,149,683 B2 10/2015 Watterson et al.
9,186,535 B2 11/2015 Ercanbrack
9,186,549 B2 11/2015 Watterson et al.
9,254,409 B2 2/2016 Dalebout et al.
9,254,416 B2 2/2016 Ashby
9,278,248 B2 3/2016 Tyger et al.
9,278,249 B2 3/2016 Watterson
9,278,250 B2 3/2016 Buchanan
9,289,648 B2 3/2016 Watterson
9,339,691 B2 5/2016 Brammer
9,352,185 B2 5/2016 Hendrickson et al.
9,352,186 B2 5/2016 Watterson
9,375,605 B2 6/2016 Tyger et al.
9,381,394 B2 7/2016 Mortensen et al.
9,387,387 B2 7/2016 Dalebout
9,393,453 B2 7/2016 Watterson
9,403,047 B2 8/2016 Olson et al.
9,403,051 B2 8/2016 Cutler
9,421,416 B2 8/2016 Mortensen et al.
9,457,219 B2 10/2016 Smith
9,457,220 B2 10/2016 Olson
9,457,222 B2 10/2016 Dalebout
9,460,632 B2 10/2016 Watterson
9,463,356 B2 10/2016 Rhea
9,468,794 B2 10/2016 Barton
9,468,798 B2 10/2016 Dalebout
9,480,874 B2 11/2016 Cutler
9,492,704 B2 11/2016 Mortensen et al.
9,498,668 B2 11/2016 Smith
9,517,378 B2 12/2016 Ashby et al.
9,521,901 B2 12/2016 Dalebout
9,533,187 B2 1/2017 Dalebout
9,539,461 B2 1/2017 Ercanbrack
9,579,544 B2 2/2017 Watterson
9,586,086 B2 3/2017 Dalebout et al.
9,586,090 B2 3/2017 Watterson et al.
9,604,099 B2 3/2017 Taylor
9,616,276 B2 4/2017 Dalebout et al.
9,616,278 B2 4/2017 Olson
9,623,281 B2 4/2017 Hendrickson et al.
9,636,567 B2 5/2017 Brammer et al.
9,675,839 B2 6/2017 Dalebout et al.
9,682,307 B2 6/2017 Dalebout
9,694,234 B2 7/2017 Dalebout et al.
9,694,242 B2 7/2017 Ashby et al.
9,737,755 B2 8/2017 Dalebout
9,757,605 B2 9/2017 Olson et al.
9,764,186 B2 9/2017 Dalebout et al.
9,767,785 B2 9/2017 Ashby et al.
9,795,822 B2 10/2017 Smith et al.
9,808,672 B2 11/2017 Dalebout
9,849,326 B2 12/2017 Smith
9,878,210 B2 1/2018 Watterson
9,889,334 B2 2/2018 Ashby et al.
9,889,339 B2 2/2018 Douglass
9,937,376 B2 4/2018 McInelly et al.
9,937,377 B2 4/2018 McInelly et al.
9,937,378 B2 4/2018 Dalebout et al.
9,937,379 B2 4/2018 Mortensen et al.
9,943,719 B2 4/2018 Smith et al.
9,943,722 B2 4/2018 Dalebout
9,948,037 B2 4/2018 Ashby
9,968,816 B2 5/2018 Olson et al.
9,968,821 B2 5/2018 Finlayson et al.
9,968,823 B2 5/2018 Cutler
10,010,755 B2 7/2018 Watterson
10,010,756 B2 7/2018 Watterson
10,029,145 B2 7/2018 Douglass
D826,350 S 8/2018 Hochstrasser
10,046,196 B2 8/2018 Ercanbrack et al.
D827,733 S 9/2018 Hochstrasser
10,065,064 B2 9/2018 Smith et al.
10,071,285 B2 9/2018 Smith et al.
10,085,586 B2 10/2018 Smith et al.
10,086,254 B2 10/2018 Watterson
10,136,842 B2 11/2018 Ashby
10,186,161 B2 1/2019 Watterson
10,188,890 B2 1/2019 Olson et al.
10,207,143 B2 2/2019 Dalebout et al.
10,207,145 B2 2/2019 Tyger et al.
10,207,147 B2 2/2019 Ercanbrack et al.
10,207,148 B2 2/2019 Powell et al.
10,212,994 B2 2/2019 Watterson et al.
10,220,259 B2 3/2019 Brammer
10,226,396 B2 3/2019 Ashby
10,226,664 B2 3/2019 Dalebout et al.
10,252,109 B2 4/2019 Watterson
10,258,828 B2 4/2019 Dalebout et al.
10,272,317 B2 4/2019 Watterson
10,279,212 B2 5/2019 Dalebout et al.
10,293,211 B2 5/2019 Watterson et al.
D852,292 S 6/2019 Cutler
10,343,017 B2 7/2019 Jackson
10,376,736 B2 8/2019 Powell et al.
10,388,183 B2 8/2019 Watterson
10,391,361 B2 8/2019 Watterson
D864,320 S 10/2019 Weston
D864,321 S 10/2019 Weston
10,426,989 B2 10/2019 Dalebout
10,433,612 B2 10/2019 Ashby et al.
10,441,840 B2 10/2019 Dalebout
10,441,844 B2 10/2019 Powell
10,449,416 B2 10/2019 Dalebout et al.
10,471,299 B2 11/2019 Powell
D868,909 S 12/2019 Cutler et al.
10,492,519 B2 12/2019 Capell et al.
10,493,349 B2 12/2019 Watterson
10,500,473 B2 12/2019 Watterson
10,537,764 B2 1/2020 Smith et al.
10,543,395 B2 1/2020 Powell et al.
10,561,877 B2 2/2020 Workman
10,561,893 B2 2/2020 Chatterton et al.
10,561,894 B2 2/2020 Dalebout et al.
10,569,121 B2 2/2020 Watterson
10,569,123 B2 2/2020 Hochstrasser et al.
10,625,114 B2 4/2020 Ercanbrack

(56) References Cited

U.S. PATENT DOCUMENTS

| | | | |
|---|---|---|---|
| 10,625,137 B2 | 4/2020 | Dalebout et al. | |
| 10,661,114 B2 | 5/2020 | Watterson et al. | |
| 10,668,320 B2 | 6/2020 | Watterson | |
| 10,671,705 B2 | 6/2020 | Capell et al. | |
| 10,688,346 B2 | 6/2020 | Brammer | |
| 10,702,736 B2 | 7/2020 | Weston et al. | |
| 10,709,925 B2 | 7/2020 | Dalebout et al. | |
| 10,726,730 B2 | 7/2020 | Watterson | |
| 10,729,965 B2 | 8/2020 | Powell | |
| 10,758,767 B2 | 9/2020 | Olson et al. | |
| 10,786,706 B2 | 9/2020 | Smith | |
| 10,864,407 B2 | 12/2020 | Watterson et al. | |
| 10,918,905 B2 | 2/2021 | Powell et al. | |
| 10,932,517 B2 | 3/2021 | Ashby et al. | |
| 10,940,360 B2 | 3/2021 | Dalebout et al. | |
| 10,953,268 B1 | 3/2021 | Dalebout et al. | |
| 10,953,305 B2 | 3/2021 | Dalebout et al. | |
| 10,967,214 B1 | 4/2021 | Olson et al. | |
| 10,994,173 B2 | 5/2021 | Watterson | |
| 11,000,730 B2 | 5/2021 | Dalebout et al. | |
| 11,013,960 B2 | 5/2021 | Watterson et al. | |
| 11,033,777 B1 | 6/2021 | Watterson et al. | |
| 11,058,913 B2 | 7/2021 | Dalebout et al. | |
| 11,058,914 B2 | 7/2021 | Powell | |
| 11,058,918 B1 | 7/2021 | Watterson et al. | |
| 11,187,285 B2 | 11/2021 | Wrobel | |
| 11,298,577 B2 | 4/2022 | Watterson | |
| 11,326,673 B2 | 5/2022 | Buchanan | |
| 11,338,169 B2 | 5/2022 | Dalebout et al. | |
| 11,338,175 B2 | 5/2022 | Watterson et al. | |
| 11,426,633 B2 | 8/2022 | Watterson et al. | |
| 11,451,108 B2 | 9/2022 | Tinney | |
| 11,452,903 B2 | 9/2022 | Watterson | |
| 11,511,152 B2 | 11/2022 | Powell et al. | |
| 11,534,651 B2 | 12/2022 | Ercanbrack et al. | |
| 11,534,654 B2 | 12/2022 | Silcock et al. | |
| 11,534,655 B2 | 12/2022 | Dalebout et al. | |
| 11,565,148 B2 | 1/2023 | Dalebout et al. | |
| 11,596,830 B2 | 3/2023 | Dalebout et al. | |
| 11,642,564 B2 | 5/2023 | Watterson | |
| 11,673,036 B2 | 6/2023 | Dalebout et al. | |
| 11,680,611 B2 | 6/2023 | Wrobel | |
| 11,700,905 B2 | 7/2023 | Ashby et al. | |
| 11,708,874 B2 | 7/2023 | Wrobel | |
| 2008/0051256 A1 | 2/2008 | Ashby et al. | |
| 2008/0273008 A1* | 11/2008 | Chang | A63F 13/285 345/184 |
| 2015/0005672 A1* | 1/2015 | Gangwish | A61H 99/00 600/587 |
| 2015/0251055 A1 | 9/2015 | Ashby | |
| 2015/0265871 A1* | 9/2015 | Patel | A61B 5/369 482/8 |
| 2015/0313789 A1* | 11/2015 | Babiarz | A63B 21/22 601/19 |
| 2017/0124912 A1 | 5/2017 | Ashby et al. | |
| 2017/0181552 A1* | 6/2017 | Galitzer | A47C 27/082 |
| 2017/0193578 A1 | 7/2017 | Watterson | |
| 2017/0266489 A1 | 9/2017 | Douglass et al. | |
| 2017/0270820 A1 | 9/2017 | Ashby et al. | |
| 2018/0085630 A1 | 3/2018 | Capell et al. | |
| 2018/0099116 A1 | 4/2018 | Ashby | |
| 2018/0099180 A1 | 4/2018 | Wilkinson | |
| 2018/0111034 A1 | 4/2018 | Watterson | |
| 2019/0216680 A1* | 7/2019 | Lee | A61H 7/00 |
| 2019/0223612 A1 | 7/2019 | Watterson et al. | |
| 2019/0269971 A1 | 9/2019 | Capell et al. | |
| 2020/0009417 A1 | 1/2020 | Dalebout | |
| 2020/0368575 A1 | 11/2020 | Hays et al. | |
| 2020/0391069 A1 | 12/2020 | Olson et al. | |
| 2021/0001177 A1 | 1/2021 | Smith | |
| 2021/0046353 A1 | 2/2021 | Dalebout et al. | |
| 2021/0085555 A1* | 3/2021 | Davis | A61H 23/00 |
| 2021/0106899 A1 | 4/2021 | Willardson et al. | |
| 2021/0110910 A1 | 4/2021 | Ostler et al. | |
| 2021/0146221 A1 | 5/2021 | Dalebout et al. | |
| 2021/0213331 A1 | 7/2021 | Watterson | |
| 2021/0268336 A1 | 9/2021 | Watterson et al. | |
| 2021/0291013 A1 | 9/2021 | Nascimento | |
| 2021/0299518 A1 | 9/2021 | Brammer et al. | |
| 2021/0299542 A1 | 9/2021 | Brammer et al. | |
| 2021/0339079 A1 | 11/2021 | Dalebout et al. | |
| 2021/0393473 A1* | 12/2021 | Kim | A61B 5/6891 |
| 2022/0062685 A1 | 3/2022 | Ashby et al. | |
| 2022/0104992 A1 | 4/2022 | Ashby | |
| 2022/0212052 A1 | 7/2022 | Ercanbrack et al. | |
| 2022/0241649 A1 | 8/2022 | Ashby | |
| 2022/0241665 A1 | 8/2022 | Dalebout et al. | |
| 2022/0241668 A1 | 8/2022 | Willardson et al. | |
| 2022/0249912 A1 | 8/2022 | Watterson et al. | |
| 2022/0257994 A1 | 8/2022 | Smith | |
| 2022/0258007 A1 | 8/2022 | Watterson et al. | |
| 2022/0258008 A1 | 8/2022 | Watterson et al. | |
| 2022/0266085 A1 | 8/2022 | Dalebout et al. | |
| 2022/0280857 A1 | 9/2022 | Watterson | |
| 2022/0309042 A1 | 9/2022 | Archer | |
| 2022/0314078 A1 | 10/2022 | Watterson et al. | |
| 2022/0323827 A1 | 10/2022 | Watterson et al. | |
| 2022/0339493 A1 | 10/2022 | Larsen | |
| 2022/0339520 A1 | 10/2022 | Toth | |
| 2022/0342969 A1 | 10/2022 | Watterson et al. | |
| 2022/0347516 A1 | 11/2022 | Taylor | |
| 2022/0347548 A1 | 11/2022 | Watterson | |
| 2022/0362613 A1 | 11/2022 | Watterson et al. | |
| 2022/0362624 A1 | 11/2022 | Dalebout | |
| 2022/0395729 A1 | 12/2022 | Toth | |
| 2023/0039903 A1 | 2/2023 | Brammer et al. | |
| 2023/0054845 A1 | 2/2023 | Smith | |
| 2023/0122235 A1 | 4/2023 | Ashby et al. | |
| 2023/0128721 A1 | 4/2023 | Plummer | |
| 2023/0158358 A1 | 5/2023 | Ercanbrack et al. | |
| 2023/0181993 A1 | 6/2023 | Taylor et al. | |
| 2023/0191189 A1 | 6/2023 | Taylor et al. | |
| 2023/0191197 A1 | 6/2023 | Ashby | |
| 2023/0218975 A1 | 7/2023 | Toles et al. | |
| 2023/0226401 A1 | 7/2023 | Watterson | |

OTHER PUBLICATIONS

U.S. Appl. No. 17/739,819, filed May 9, 2022, Buchanan.
U.S. Appl. No. 17/841,313, filed Jun. 15, 2022, Weston et al.
U.S. Appl. No. 17/963,822, filed Oct. 11, 2022, Powell.
U.S. Appl. No. 18/091,004, filed Dec. 29, 2022, Cox.
U.S. Appl. No. 18/103,221, filed Jan. 30, 2023, Dalebout et al.
U.S. Appl. No. 18/114,758, filed Feb. 27, 2023, Cutler et al.
U.S. Appl. No. 18/117,263, filed Mar. 3, 2023, Smith et al.
U.S. Appl. No. 18/123,026, filed Mar. 17, 2023, Silcock et al.
U.S. Appl. No. 18/132,277, filed Apr. 7, 2023, Vasquez et al.
U.S. Appl. No. 18/136,535, filed Apr. 19, 2023, Ashby et al.
U.S. Appl. No. 18/141,872, filed May 1, 2023, Ashby et al.
U.S. Appl. No. 18/205,299, filed Jun. 2, 2023, Wrobel.
U.S. Appl. No. 18/207,512, filed Jun. 8, 2023, Chuang.
U.S. Appl. No. 18/210,505, filed Jun. 15, 2023, Nielsen et al.
U.S. Appl. No. 29/702,127, filed Sep. 16, 2019, Cutler et al.
U.S. Appl. No. 62/273,852, filed Dec. 31, 2015, Watterson.
U.S. Appl. No. 63/073,081, filed Sep. 1, 2021, Ashby et al.
U.S. Appl. No. 63/079,697, filed Sep. 7, 2020, Willardson et al.
U.S. Appl. No. 63/086,793, filed Oct. 20, 2020, Ashby.
U.S. Appl. No. 63/134,036, filed Jan. 5, 2021, Ercanbrack et al.
U.S. Appl. No. 63/150,066, filed Feb. 16, 2021, Smith.
U.S. Appl. No. 63/156,801, filed Mar. 4, 2021, Watterson.
U.S. Appl. No. 63/165,498, filed Mar. 24, 2021, Archer.
U.S. Appl. No. 63/179,094, filed Apr. 23, 2021, Watterson et al.
U.S. Appl. No. 63/180,521, filed Apr. 27, 2021, Watterson et al.
U.S. Appl. No. 63/187,348, filed May 11, 2021, Dalebout et al.
U.S. Appl. No. 63/188,431, filed May 13, 2021, Plummer.
U.S. Appl. No. 63/200,903, filed Apr. 2, 2021, Watterson et al.
U.S. Appl. No. 63/211,870, filed Jun. 17, 2021, Watterson et al.
U.S. Appl. No. 63/216,313, filed Jun. 29, 2021, Watterson et al.
U.S. Appl. No. 63/229,794, filed Aug. 12, 2021, Brammer.
U.S. Appl. No. 63/235,002, filed Aug. 19, 2021, Smith.
U.S. Appl. No. 63/254,470, filed Oct. 11, 2021, Powell.

(56) References Cited

OTHER PUBLICATIONS

U.S. Appl. No. 63/278,714, filed Nov. 12, 2021, Taylor.
U.S. Appl. No. 63/289,997, filed Dec. 15, 2021, Taylor et al.
U.S. Appl. No. 63/290,455, filed Dec. 16, 2021, Taylor et al.
U.S. Appl. No. 63/290,557, filed Dec. 16, 2021, Ashby.
U.S. Appl. No. 63/298,170, filed Jan. 10, 2022, Ercanbrack et al.
U.S. Appl. No. 63/299,357, filed Jan. 13, 2022, Toles et al.
U.S. Appl. No. 63/305,976, filed Feb. 2, 2022, Watterson.
U.S. Appl. No. 63/329,270, filed Apr. 8, 2022, Vasquez et al.
U.S. Appl. No. 63/332,581, filed Apr. 25, 2022, Ashby et al.
U.S. Appl. No. 63/338,265, filed May 4, 2022, Ashby et al.
U.S. Appl. No. 63/350,072, filed Jun. 8, 2022, Chuang.
U.S. Appl. No. 63/352,539, filed Jun. 15, 2022, Nielsen et al.
U.S. Appl. No. 63/471,680, filed Jun. 7, 2023, Powell et al.

* cited by examiner

MASSAGE ROLLER WITH PRESSURE SENSORS

CROSS-REFERENCE TO RELATED APPLICATIONS

This application claims priority to and the benefit of U.S. Provisional Patent Application No. 63/086,793, filed on Oct. 2, 2020, which is hereby incorporated by reference in its entirety.

BACKGROUND

Background and Relevant Art

Exercise is a popular way to improve a person's fitness and health. Often, during exercise, or as a result of other activities, a user may experience muscle soreness, such as knots, tight muscles, and so forth. One way to relieve pain and loosen knots and tight muscles is to receive a massage. Foam rollers are used to massage muscles and loosen knots and tight muscles.

BRIEF SUMMARY

In some embodiments, a roller includes a body having a cylindrical shape. The body has a first end, a second end, and a rolling surface that extends between the first end and the second end. A pressure sensor is located at the rolling surface.

In some embodiments, a method for performing a massage includes rolling a muscle along the roller and measuring a pressure profile of the muscle using the pressure sensor. In some embodiments, a method includes measuring a plurality of pressure measurements. A pressure change between two subsequent pressure measurements is used to determine if a massage program should be changed.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

This disclosure generally relates to devices, systems, and methods for a massage roller (herein "roller") including one or more pressure sensors. The pressure sensors may measure the pressure applied by a user's muscles to the roller. The roller may develop a pressure profile of the user's muscles. By analyzing the pressure profile, the roller may identify knots, sore muscles, tight muscles, other muscular irregularities, and combinations thereof. The roller may analyze multiple pressure profiles generated over a period of time. A change in pressure profiles may indicate that the muscle has relaxed. This may help to increase blood flow to the muscles, thereby reducing soreness and improving recovery time from a workout or an accident.

Figure 1:
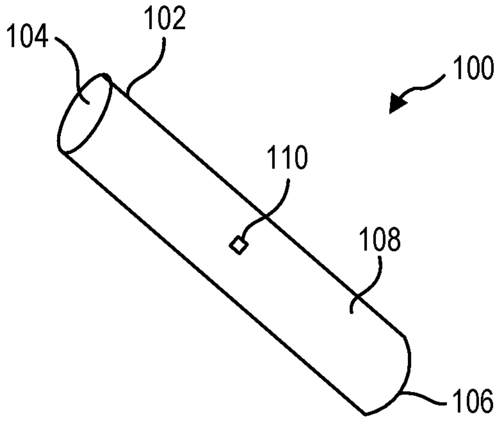
FIG. 1 is a representation of a perspective view of a roller, according to at least one embodiment of the present disclosure.

FIG. 1 is a representation of a roller 100, according to at least one embodiment of the present disclosure. The roller 100 includes a body 102 having a first end 104, a second end 106, and a rolling surface 108 extending between the first end 104 and the second end 106. In the embodiment shown, the body 102 has a cylindrical shape (e.g., has a constant circular cross-sectional shape between the first end 104 and the second end 106.) In some embodiments, the body 102 may be generally cylindrical, or have a generally round, arcuate, curved, ovoid, or other round shape. In some embodiments, the body 102 may have a length that is longer than its diameter. In some embodiments, the body 102 may have a diameter that is larger than its length. Furthermore, it should be understood that the body 102 may have any shape, including prismatic (e.g., having a constant cross-sectional shape between the first end 104 and the second end 106), conical, pyramidal, any other shape, and combinations thereof. In some embodiments, the cross-sectional shape and/or size (e.g., cross-sectional area) of the body 102 may vary along the length of the rolling surface 108.

In some embodiments, the rolling surface 108 may be smooth. In some embodiments, the rolling surface may include one or more ridges, indentations, protrusions, other surface features, and combinations thereof. Varying the smoothness of the rolling surface 108 may help the roller 100 to vary the force applied to a user during a massage.

To massage a muscle using the roller 100, a user may place that muscle on the rolling surface 108 and roll the roller 100 along a support surface. This may release lactic acid buildup in the muscle, relieve tension in the muscle, or otherwise provide relief to the muscle. For example, to massage a user's back, the user would lay down on the support surface (e.g., the floor) with her back on the rolling surface 108. The user would rock back and forth to massage her back.

In some situations, the user's muscle may be tense, have a knot, be tight, be sore, or otherwise cause discomfort. The sore portion of the muscle may be harder than the rest of the muscle and/or a relaxed muscle. The roller 100 shown includes at least one pressure sensor 110. The at least one pressure sensor 110 may be configured to measure the pressure applied by the user's muscles to the roller 100. During a massage using the roller 100, the pressure sensor 110 may compare pressure measurements to determine if a user's muscle is loosening up. This may help the user to know when to stop massaging the muscle.

In some embodiments, the pressure sensor 110 may be located at any location on the roller 100. For example, the pressure sensor 110 may be located on the top of the rolling surface 108. In some examples, the pressure sensor 110 may be located underneath (e.g., embedded in) the rolling surface 108. In some embodiments, the roller 100 may include multiple pressure sensors located at different depths beneath the rolling surface 108.

In some embodiments, the pressure sensor 110 may be any type of pressure sensor. For example, the pressure sensor 110 may be a strain gauge, a piezoelectric element, a capacitive element, a mechanical sensor, any other type of sensor, and combinations thereof. In some embodiments, the roller 100 may include a single pressure sensor 110. In some embodiments, the roller 100 may include a plurality of pressure sensors 110.

Figure 2:
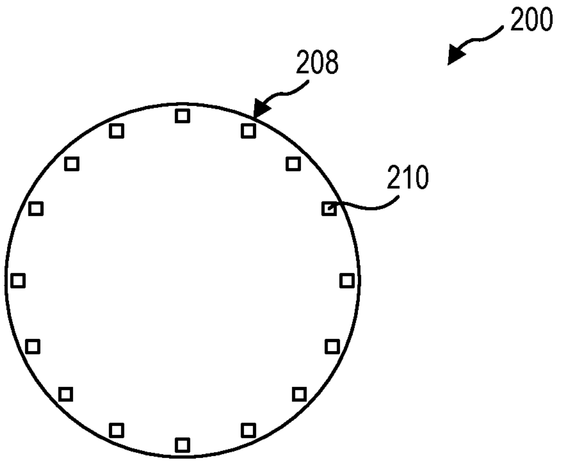
FIG. 2 is a representation of a top view of a roller, according to at least one embodiment of the present disclosure.

FIG. 2 is a representation of a side view of a roller 200, according to at least one embodiment of the present disclosure. The roller 200 includes a plurality of pressure sensors 210 arranged along circumference of a rolling surface 208. In this manner, as a user rolls a muscle along the roller 200, the roller 200 may receive pressure measurements along the rolling length of the muscle. This may help to identify and provide relief for knots, sore muscles, muscle tension, other muscular pain, and combinations thereof.

Figure 3:
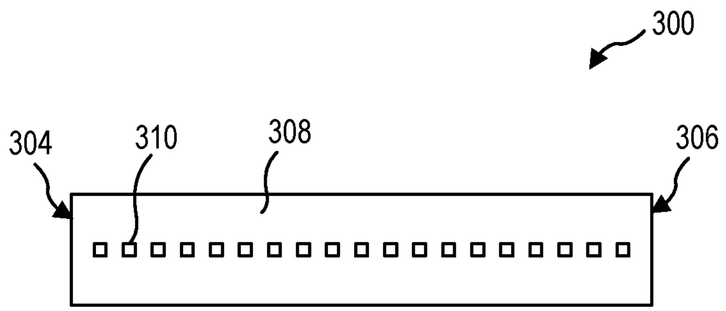
FIG. 3 is a representation of an end view of a roller, according to at least one embodiment of the present disclosure.

FIG. 3 is a representation of a top view of a roller 300, according to at least one embodiment of the present disclosure. The roller 300 includes a plurality of pressure sensors 310 arranged along a rolling surface 308. The pressure sensors 310 are arranged along a length of the rolling surface between a first end 304 and a second end 306. In this manner, the roller 300 may measure pressure measurements of a user's muscles across the length of the user's muscle. This may help to identify and provide relief for knots, sore muscles, muscle tension, other muscular pain, and combinations thereof.

In some embodiments, the roller 300 may include a plurality of pressure sensors 310 arranged in a grid along the rolling surface 308. For example, the roller 300 may include a circumferential row of pressure sensors 310 (e.g., as seen in FIG. 2) at each longitudinal location along the length of the rolling surface 308. These pressure sensors 310 may allow the roller 300 to develop a detailed pressure profile of the pressure exerted by a user's muscles on the roller 300. The pressure profile may allow the roller to determine location of tight and sore muscles. By continually receiving pressure measurements and determining pressure changes (e.g., changes in pressure measurements), the roller may determine if a knot or sore muscle has been loosened.

Figure 4:
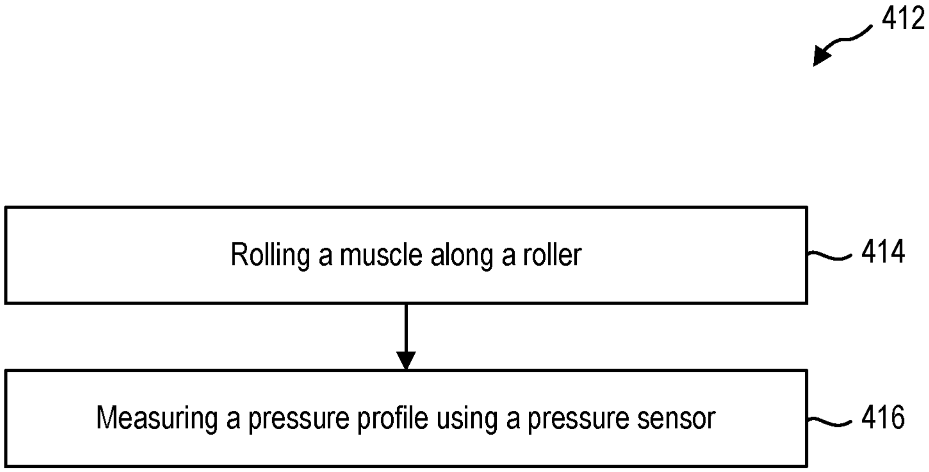
FIG. 4 is a representation of a method for performing a massage, according to at least one embodiment of the present disclosure.

FIG. 4 is a representation of a method 412 for performing a massage, according to at least one embodiment of the present disclosure. The method 412 includes rolling a muscle along a roller, the roller including a first end, a second end, and a rolling surface extending between the first end and the second end at 414. A pressure profile is of the profile is measured using a pressure sensor located at the rolling surface at 416.

In some embodiments, the method may include identifying a knot in the muscle using the pressure profile. For example, a knot may be identified by determining that a first portion of the muscle is exerting more pressure on the roller than a second portion. The pressure profile may then be analyzed over time to identify a reduction in the knot. In other words, pressure measurements taken by the pressure sensor may be compared over a period of time to determine if the knot has reduced or been eliminated.

In some embodiments, if the roller has determined that there is a reduction in the knot, the roller may provide a notification to the user. For example, the roller may provide a notification to the user to stop massaging the muscle. In some examples, the roller may provide a notification to the user to begin massaging a second muscle. In some embodiments, the notification may be an audible alert, a visual alert, a physical alert (e.g., a vibration), or any other type of alert. In some embodiments, the notification may be provided to a mobile device such as a cellular phone or other mobile device.

In some embodiments, the pressure profile may be measured using a plurality of pressure sensors. For example, the roller may include a plurality of pressure sensors located in a grid about the rolling surface of the roller. The pressure profile generated may then generate a three-dimensional map of the pressure of the user's muscle. The three-dimensional pressure profile may be compared to known pressure profiles for relaxed muscles. This may help to identify knots and/or areas of high tension. This may further help the roller to determine when a massage may be completed.

Figure 5:
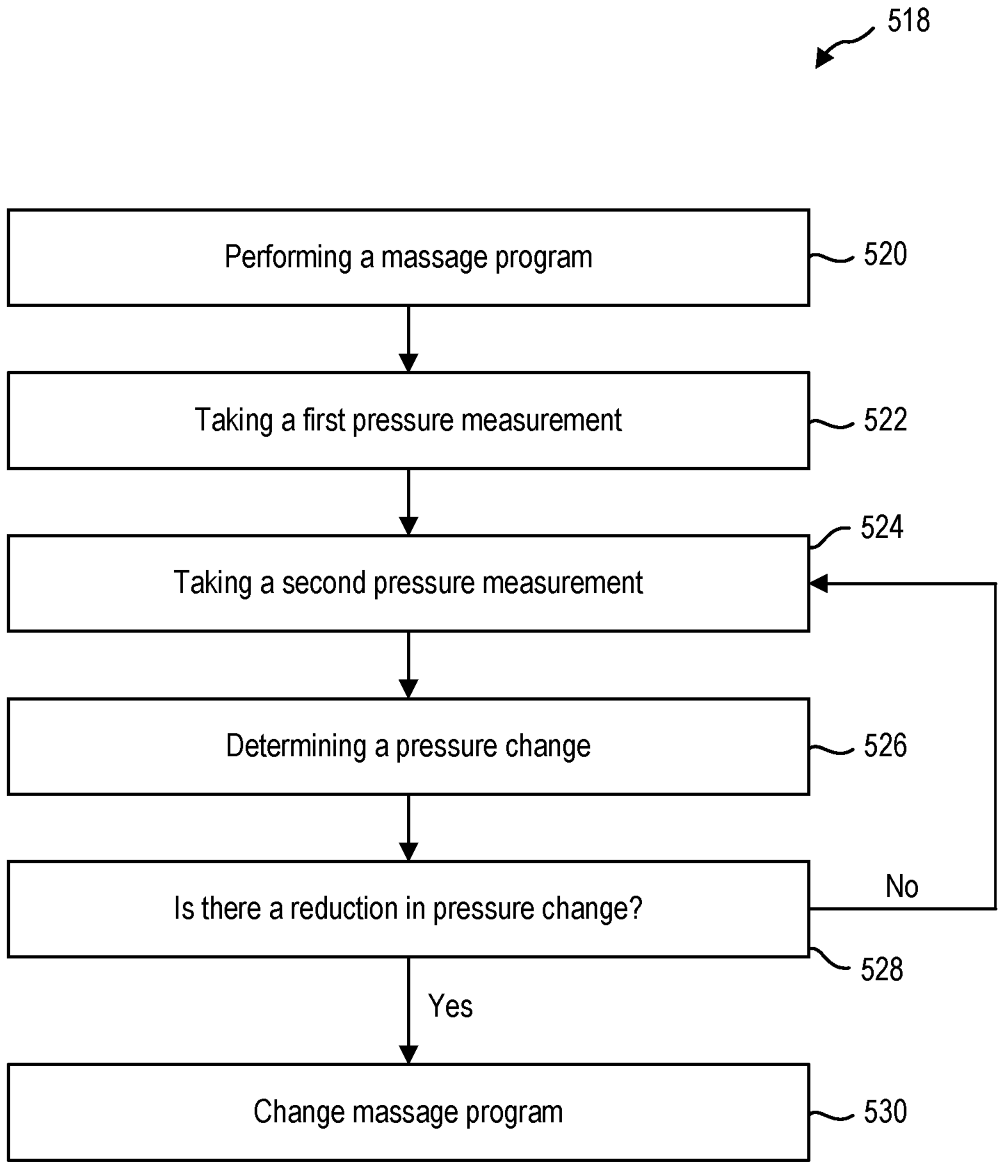
FIG. 5 is a representation of another method for performing a massage, according to at least one embodiment of the present disclosure.

FIG. 5 is a representation of a method 518, according to at least one embodiment of the present disclosure. The method 518 includes performing a massage program using a roller at 520. The method 518 further includes taking a first pressure measurement of a muscle at a first time using a pressure sensor on a rolling surface of the roller at 522. A second pressure measurement is taken at a second time at 524. A first pressure change is determined between the first pressure measurement and the second pressure measurement at 526. The roller may analyze the pressure change. If there is a reduction in the pressure change at 528, the roller may change the massage program at 530. If there is no reduction in the pressure change, then the roller may take more pressure measurements.

In some embodiments, the method 518 may include taking a third pressure measurement and determining a second pressure change between the second pressure measurement and the third pressure measurement. In some embodiments, the massage program may be changed based on the first pressure change and the second pressure change. For example, if the second pressure change is less than the first pressure change, then the roller may stop the massage program. In some embodiments, if the second pressure change is zero (e.g., no pressure change) over a period of time (e.g., 1 s, 5 s, 10 s, 15 s, 30 s, 60 s), then the roller may stop the massage program.

In some embodiments, each pressure measurement may be taken at the same measurement location on the muscle. In some embodiments, the pressure measurement may be a pressure profile measured from a plurality of pressure sensors on the roller. Determining the pressure change may include determining a pressure change in an average measured pressure over a period of time.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

INDUSTRIAL APPLICABILITY

This disclosure generally relates to devices, systems, and methods for a massage roller (herein "roller") including one or more pressure sensors. The pressure sensors may measure the pressure applied by a user's muscles to the roller. The roller may develop a pressure profile of the user's muscles. By analyzing the pressure profile, the roller may identify knots, sore muscles, tight muscles, other muscular irregularities, and combinations thereof. The roller may analyze multiple pressure profiles generated over a period of time. A change in pressure profiles may indicate that the muscle has relaxed. This may help to increase blood flow to the muscles, thereby reducing soreness and improving recovery time from a workout or an accident.

In some embodiments, a roller may include a body having a first end, a second end, and a rolling surface extending between the first end and the second end. In the embodiment shown, the body has a cylindrical shape (e.g., has a constant circular cross-sectional shape between the first end and the second end.) In some embodiments, the body may be generally cylindrical, or have a generally round, arcuate, curved, ovoid, or other round shape. In some embodiments, the body may have a length that is longer than its diameter. In some embodiments, the body may have a diameter that is larger than its length. Furthermore, it should be understood that the body may have any shape, including prismatic (e.g., having a constant cross-sectional shape between the first end and the second end), conical, pyramidal, any other shape, and combinations thereof. In some embodiments, the cross-sectional shape and/or size (e.g., cross-sectional area) of the body may vary along the length of the rolling surface.

In some embodiments, the rolling surface may be smooth. In some embodiments, the rolling surface may include one or more ridges, indentations, protrusions, other surface features, and combinations thereof. Varying the smoothness of the rolling surface may help the roller to vary the force applied to a user during a massage.

To massage a muscle using the roller, a user may place that muscle on the rolling surface and roll the roller along a support surface. This may release lactic acid buildup in the muscle, relieve tension in the muscle, or otherwise provide relief to the muscle. For example, to massage a user's back, the user would lay down on the support surface (e.g., the floor) with her back on the rolling surface. The user would rock back and forth to massage her back.

In some situations, the user's muscle may be tense, have a knot, be tight, be sore, or otherwise cause discomfort. The sore portion of the muscle may be harder than the rest of the muscle and/or a relaxed muscle. The roller shown includes at least one pressure sensor. The at least one pressure sensor may be configured to measure the pressure applied by the user's muscles to the roller. During a massage using the roller, the pressure sensor may compare pressure measurements to determine if a user's muscle is loosening up. This may help the user to know when to stop massaging the muscle.

In some embodiments, the pressure sensor may be located at any location on the roller. For example, the pressure sensor may be located on the top of the rolling surface. In some examples, the pressure sensor may be located underneath (e.g., embedded in) the rolling surface. In some embodiments, the roller may include multiple pressure sensors located at different depths beneath the rolling surface.

In some embodiments, the pressure sensor may be any type of pressure sensor. For example, the pressure sensor may be a strain gauge, a piezoelectric element, a capacitive element, a mechanical sensor, any other type of sensor, and combinations thereof. In some embodiments, the roller may include a single pressure sensor. In some embodiments, the roller may include a plurality of pressure sensors.

In some embodiments, a roller may include a plurality of pressure sensors arranged along circumference of a rolling surface. In this manner, as a user rolls a muscle along the roller, the roller may receive pressure measurements along the rolling length of the muscle. This may help to identify and provide relief for knots, sore muscles, muscle tension, other muscular pain, and combinations thereof.

In some embodiments, a roller includes a plurality of pressure sensors arranged along a rolling surface. The pressure sensors are arranged along a length of the rolling surface between a first end and a second end. In this manner, the roller may measure pressure measurements of a user's muscles across the length of the user's muscle. This may help to identify and provide relief for knots, sore muscles, muscle tension, other muscular pain, and combinations thereof.

In some embodiments, the roller may include a plurality of pressure sensors arranged in a grid along the rolling surface. For example, the roller may include a circumferential row of pressure sensors at each longitudinal location along the length of the rolling surface. These pressure sensors may allow the roller to develop a detailed pressure profile of the pressure exerted by a user's muscles on the roller. The pressure profile may allow the roller to determine location of tight and sore muscles. By continually receiving pressure measurements and determining pressure changes (e.g., changes in pressure measurements), the roller may determine if a knot or sore muscle has been loosened.

In some embodiments, a method for performing a massage includes rolling a muscle along a roller, the roller including a first end, a second end, and a rolling surface extending between the first end and the second end. A pressure profile is of the profile is measured using a pressure sensor located at the rolling surface.

In some embodiments, the method may include identifying a knot in the muscle using the pressure profile. For example, a knot may be identified by determining that a first portion of the muscle is exerting more pressure on the roller than a second portion. The pressure profile may then be analyzed over time to identify a reduction in the knot. In other words, pressure measurements taken by the pressure sensor may be compared over a period of time to determine if the knot has reduced or been eliminated.

In some embodiments, if the roller has determined that there is a reduction in the knot, the roller may provide a notification to the user. For example, the roller may provide a notification to the user to stop massaging the muscle. In some examples, the roller may provide a notification to the user to begin massaging a second muscle. In some embodiments, the notification may be an audible alert, a visual alert, a physical alert (e.g., a vibration), or any other type of alert. In some embodiments, the notification may be provided to a mobile device such as a cellular phone or other mobile device.

In some embodiments, the pressure profile may be measured using a plurality of pressure sensors. For example, the roller may include a plurality of pressure sensors located in a grid about the rolling surface of the roller. The pressure profile generated may then generate a three-dimensional map of the pressure of the user's muscle. The three-dimensional pressure profile may be compared to known pressure profiles for relaxed muscles. This may help to identify knots and/or areas of high tension. This may further help the roller to determine when a massage may be completed.

In some embodiments, a method includes performing a massage program using a roller. The method further includes taking a first pressure measurement of a muscle at a first time using a pressure sensor on a rolling surface of the roller. A second pressure measurement is taken at a second time. A first pressure change is determined between the first pressure measurement and the second pressure measurement. The roller may analyze the pressure change. If there is a reduction in the pressure change at 528, the roller may change the massage program. If there is no reduction in the pressure change, then the roller may take more pressure measurements.

In some embodiments, the method may include taking a third pressure measurement and determining a second pressure change between the second pressure measurement and the third pressure measurement. In some embodiments, the massage program may be changed based on the first pressure change and the second pressure change. For example, if the second pressure change is less than the first pressure change, then the roller may stop the massage program. In some embodiments, if the second pressure change is zero (e.g., no pressure change) over a period of time (e.g., 1 s, 5 s, 10 s, 15 s, 30 s, 60 s), then the roller may stop the massage program.

In some embodiments, each pressure measurement may be taken at the same measurement location on the muscle. In some embodiments, the pressure measurement may be a pressure profile measured from a plurality of pressure sensors on the roller. Determining the pressure change may include determining a pressure change in an average measured pressure over a period of time.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Following are sections consistent with embodiments of the present disclosure:

1. A roller, comprising:
   - a body with a generally cylindrical shape, the body having a first end, a second end, and a rolling surface extending between the first end and the second end; and
   - a pressure sensor located at the rolling surface.
2. The roller of section 1, wherein the pressure sensor includes a plurality of pressure sensors.
3. The roller of section 2, wherein the plurality of pressure sensors extend in a row along a length of the rolling surface from the first end to the second end.
4. The roller of section 2 or 3, wherein the plurality of pressure sensors extend circumferentially around the rolling surface.
5. The roller of any of sections 2-4, wherein the plurality of pressure sensors form a grid along the rolling surface between the first end and the second end.
6. The roller of any of sections 1-5, wherein the pressure sensor is located beneath the rolling surface.
7. The roller of any of sections 1-6, wherein the rolling surface includes one or more ridges.
8. A method for performing a massage, comprising:
   - rolling a muscle along a roller, the roller including a first end, a second end, and a rolling surface extending between the first end and the second end; and
   - measuring a pressure profile of the muscle using a pressure sensor located at the rolling surface.
9. The method of section 8, further comprising identifying a knot in the muscle using the pressure profile.
10. The method of section 9, further comprising analyzing the pressure profile over time.
11. The method of section 10, further comprising identifying a reduction in the knot.
12. The method of section 11, further comprising providing a notification to stop rolling the muscle after identifying the reduction in the knot.
13. The method of any of sections 8-12, wherein the pressure sensor includes a plurality of pressure sensors, and wherein measuring the pressure profile of the muscle includes measuring the pressure profile using the plurality of sensors.
14. The method of section 13, wherein the plurality of pressure sensors form a grid along the rolling surface between the first end and the second end.
15. A method for performing a massage, comprising:
   - performing a massage program using a roller;
   - taking a first pressure measurement of a muscle at a first time using a pressure sensor on a rolling surface of the roller, the rolling surface extending between a first end and a second end;
   - taking a second pressure measurement of the muscle at a second time using the pressure sensor;
   - determining a first pressure change between the first pressure measurement and the second pressure measurement;
   - taking a third pressure measurement of the muscle at a third time using the pressure sensor;
   - determining a second pressure change between the third pressure measurement and the second pressure measurement; and
   - based on the first pressure change and the second pressure change, changing the massage program.
16. The method of section 15, wherein taking the first pressure measurement, the second pressure measurement, and the third pressure measurement includes taking the first pressure measurement, the second pressure measurement, and the third pressure measurement at the same measurement location on the muscle.

17. The method of section 15 or 16, wherein changing the massage program includes ending the massage program.

18. The method of section 17, wherein ending the massage program includes ending the massage program when the second pressure change is less than the first pressure change.

19. The method of any of sections 15-18, wherein taking the first pressure measurement, the second pressure measurement, and the third pressure measurement includes taking a first pressure profile, a second pressure profile, and a third pressure profile, the first pressure profile, the second pressure profile, and the third pressure profile being measured from a plurality of sensors extending along the rolling surface.

20. The method of any of sections 15-19, wherein determining the first pressure change includes determining an average change in measured pressure over a period of time.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for performing a massage, comprising:

rolling, as part of a massage program, a muscle along a roller, the roller including a first end, a second end, and a rolling surface extending between the first end and the second end;

measuring a pressure profile of the muscle using a plurality of pressure sensors located at the rolling surface;

identifying an area of high pressure in the muscle using the pressure profile;

analyzing the pressure profile over time, wherein analyzing the pressure profile over time comprises:

determining a first pressure change between a first pressure measurement of the muscle and a second pressure measurement of the muscle; and determining a second pressure change between the second pressure measurement of the muscle and a third pressure measurement of the muscle; and changing the massage program based on the first pressure change and the second pressure change, wherein changing the massage program comprises ending the massage program after the second pressure change is less than the first pressure change.

2. The method of claim 1, further comprising:

identifying a reduction in the area of high pressure in the muscle.

3. The method of claim 2, further comprising:

providing a notification to stop rolling the muscle based on identifying the reduction in the area of high pressure in the muscle.

4. The method of claim 1, wherein the plurality of pressure sensors forms a grid along the rolling surface between the first end and the second end.

5. A method for performing a massage, comprising:

performing a massage program using a roller;

taking a first pressure measurement at a location of a muscle at a first time using a plurality of pressure sensors on a rolling surface of the roller, the rolling surface extending between a first end and a second end, wherein the first pressure measurement at the location of the muscle is associated with a first pressure profile of the muscle at the first time;

taking a second pressure measurement at the location of the muscle at a second time using the plurality of pressure sensors, wherein the second pressure measurement at the location of the muscle is associated with a second pressure profile of the muscle at the second time;

determining a first pressure change between the first pressure measurement and the second pressure measurement;

taking a third pressure measurement at the location of the muscle at a third time using the plurality of pressure sensors, wherein the third pressure measurement at the location of the muscle is associated with a third pressure profile of the muscle at the third time;

determining a second pressure change between the third pressure measurement and the second pressure measurement; and changing the massage program based on the first pressure change and the second pressure change, wherein changing the massage program comprises ending the massage program after the second pressure change is less than the first pressure change.

6. The method of claim 5, wherein taking the first pressure measurement, the second pressure measurement, and the third pressure measurement comprises:

taking the first pressure profile, the second pressure profile, and the third pressure profile, the first pressure profile, the second pressure profile, and the third pressure profile being measured from the plurality of sensors extending along the rolling surface.

7. The method of claim 5, wherein determining the first pressure change comprises:

determining an average change in measured pressure over a period of time.

8. The method of claim 1, wherein measuring the pressure profile of the muscle comprises:

taking a plurality of pressure measurements of the muscle using the pressure sensor.

9. The method of claim 1, wherein identifying the area of high pressure in the muscle comprises:

identifying, based on measuring the pressure profile, that a first portion of the muscle is associated with a higher pressure measurement than a second portion of the muscle.

10. The method of claim 1, wherein analyzing the pressure profile over time comprises:

comparing the first pressure measurement of the muscle with the second pressure measurement of the muscle to determine the first pressure change at the muscle.

11. The method of claim 2, wherein identifying the reduction in the area of high pressure comprises:

identifying the reduction of pressure at the muscle based on analyzing the pressure profile.

12. The method of claim 5, further comprising:

comparing the first pressure change with the second pressure change, wherein changing the massage program is based on comparing the first pressure change with the second pressure change.

13. The method of claim 5, wherein ending the massage program comprises:

ending the massage program based on the second pressure change being zero.

* * * * *